United States Patent
Ma et al.

(10) Patent No.: US 6,681,044 B1
(45) Date of Patent: Jan. 20, 2004

(54) RETRIEVAL OF CURSIVE CHINESE HANDWRITTEN ANNOTATIONS BASED ON RADICAL MODEL

(75) Inventors: Yue Ma, West Windsor, NJ (US); Chi Zhang, Boston, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/538,101

(22) Filed: Mar. 29, 2000

(51) Int. Cl.⁷ .................................................. G06K 9/18
(52) U.S. Cl. ........................ 382/185; 382/186; 382/190; 382/305
(58) Field of Search ................................. 382/161, 173, 382/177, 178, 179, 181, 185, 186, 187, 188, 190, 209, 215, 217, 218, 224, 229, 298, 305

(56) References Cited

U.S. PATENT DOCUMENTS

| | | | |
|---|---|---|---|
| 5,333,209 A | * 7/1994 | Sinden et al. | 382/187 |
| 5,742,705 A | * 4/1998 | Parthasarathy | 382/185 |
| 5,757,964 A | * 5/1998 | Lee et al. | 382/229 |
| 5,812,697 A | * 9/1998 | Sakai et al. | 382/186 |
| 5,832,474 A | 11/1998 | Lopresti et al. | 707/2 |
| 5,923,778 A | * 7/1999 | Chen et al. | 382/185 |
| 6,041,137 A | * 3/2000 | Van Kleeck | 382/185 |
| 6,275,611 B1 | * 8/2001 | Parthasarathy | 382/187 |

OTHER PUBLICATIONS

Chou, et al "Radical–based neighboring matching method for on–line Chinese character recognition", IEEE, pp. 84–88, 1996.*

Daniel P. Lopresti, Matthew Y. Ma, Patrick S. P. Wang, Jill D. Crisman, "Ink Matching Of Cursive Chinese Handwritten Annotations," International Journal Of Pattern Recognition And Artificial Intelligence vol. 12 No. 1 (1998) 119–141.

* cited by examiner

*Primary Examiner*—Daniel Mariam
(74) *Attorney, Agent, or Firm*—Harness, Dickey & Pierce, PLC (57) ABSTRACT

Cursive Chinese characters are analyzed using a semantic matching process whereby radicals within the character are first extracted and used to reduce the search space of the full lexicon to only those characters containing the matching radical. In performing the radical extraction, the input character is normalized and segmented into strokes that are in turn organized based on stroke up/down information and local maxima and minima information. Obscure breakpoints and connecting strokes are removed in the process. Dynamic program matching is then performed on a stroke basis in which stroke substitution costs are assessed on a point-by-point basis through a variety of techniques, including tangent vector analysis, center relationship assessment and starting point/ending point assessment. Dynamic programming costs are normalized based on the length of the reference radical and location dissimilarities are removed.

16 Claims, 6 Drawing Sheets

RETRIEVAL OF CURSIVE CHINESE HANDWRITTEN ANNOTATIONS BASED ON RADICAL MODEL

BACKGROUND AND SUMMARY OF THE INVENTION

The present invention relates generally to handwriting processing. More particularly, the invention relates to an improved ink matching technique for cursive Chinese characters. The ink matching technique addresses the fact that there is a very large number of characters in the written Chinese language, and that conventional matching techniques, such as would be used to match letters in the English alphabet, are simply not powerful enough for retrieval purposes.

Ink matching works on the basic assumption that electronic ink can serve as first class data that can be matched without attempting to recognize it. In other words, a user may draw a cursive character and the electronic ink data comprising the temporal and spatial information associated with the cursive strokes is used in a searching or matching operation, without the need to interpret what characters those strokes represent.

The improvement described here lies in a powerful radical extraction technique, with associated improvements in dynamic programming matching. The invention is valuable for all Chinese languages, as well as other languages in which Chinese characters are used. Chinese characters are in popular use today throughout much of Asia, including China, Taiwan, Japan, Korea, and elsewhere.

Chinese characters trace their roots to one of humanity's earliest forms of writing: the pictograph. A single character, which may be made up of one or more sub-characters known as radicals, represents a single word, thought or concept. Thus, unlike the alphabet letters used to spell words in the English language, Chinese characters are more compact. Each represents an entire word, thought or concept in a single character.

While the Chinese character represents a compact and highly efficient form of communication, it has posed problems in automation systems. Entering Chinese characters into the computer is a bottleneck, which some have proposed to solve by using the digitizing tablet instead of a keyboard. The tablet allows a user to enter his or her handwriting into the computer, and handwriting recognition techniques convert the user's handwriting into recognized text which may then be input into the computer. In the field of handwritten Chinese character recognition, on-line recognition has the advantage of capturing the temporal order of the input points and strokes as they are drawn. Thus, the on-line recognition system can distinguish between a line drawn from top down and a line drawn from bottom up, by the temporal data generated as the lines are drawn.

While great strides have been made in handwritten Chinese character recognition, the complexity of the problem has proven greater than originally anticipated. This is in no small part due to the large number of characters that are needed in a lexicon designed for normal business use. For example, in the written Chinese language, there are on average, three thousand to five thousand characters in daily use. In the written Japanese language, the number of Chinese characters, or "kanji" characters, is somewhat smaller. Nevertheless, one still needs to understand several thousand characters in order to read a Japanese newspaper. Furthermore, another difficulty of handwritten character recognition is due to the style of handwriting which varies greatly with writers, and more often people write cursively.

Recently, the ink matching technique has been shown promising in certain applications such as searching of handwritten annotations for document retrieval purpose. For further background, see U.S. Pat. No. 5,832,474, "Document Search and Retrieval System with Partial Match Searching of User-Drawn Annotations." In these applications, ink matching can be advantageous over traditional character recognition techniques for it handles various styles of handwriting, particularly cursive handwriting. More recently, semantic matching techniques were introduced, where the character is subdivided into its component radicals and those radicals are then pre-searched to reduce the character matching problem to one of a smaller size. By performing a partial match based on the extracted radical, the subsequent character matching process does not need to examine those characters that do not include the matched radical.

While semantic matching based on reference radicals is a very promising technique, the success of the technique hinges upon the system's ability to extract the radical from the complete character. Radical extraction is a most challenging problem. Because the hand drawn Chinese character is usually drawn free form, without any grid lines, the location of the radical within the character can vary considerably each time the character is drawn. Also, the radical may inadvertently intersect with other parts of the character, making the radical difficult to identify as a separate element within the character. Moreover, when writing quickly, the user may allow the pen to draw inadvertent connecting strokes that join the ending stroke of one part of the character with the beginning stroke of the next part. Although the connecting strokes are not actually part of the character, they are nevertheless present in the stroke data, simply because the user may not have lifted the pen or stylus between drawing individual parts of the character.

Apart from the above issues there is the additional issue of dynamic programming. Dynamic programming is a pattern matching technique that assesses insertion costs, deletion costs and substitution costs in determining whether one pattern (such as a stroke within a radical) matches another pattern. Conventionally, stroke insertion costs and stroke deletion costs are computed in direct proportion to the length of the strokes. Stroke substitution costs are more complicated because they involve measuring the shape similarity between two strokes. Using conventional techniques, a dynamic programming is used to obtain a set of pairs of points between two strokes to be considered for substitution. Substitution cost is measured as the sum of Euclidean distance for each pair of two points. Before the substitution cost is computed, each stroke is temporarily displaced so that the top left corner of the bounding box of that stroke overlaps with the origin (0,0).

The conventional Euclidean-based method for calculating substitution costs has two disadvantages. First, the dynamic programming procedure is time consuming. Second, errors induced using the Euclidean distance technique are cumulative. After the reference stroke and stroke being tested are each displaced so their top left corners overlap the origin, a point by point distance analysis is performed. If the basic shapes of the respective strokes are relatively the same, the Euclidean distance technique can give a useful figure of merit. However, if the respective strokes are essentially the same in shape except for their top left corners, the Euclidean distance technique fails. By aligning the top left corners of the two strokes, the remainder of the strokes find themselves separated at a large Euclidean distance, resulting in an incorrect assessment that the strokes are not similar to one another in shape.

SUMMARY OF THE INVENTION

The present invention provides a greatly improved radical extraction technique that will significantly improve the semantic matching performance. As will be more fully discussed herein, the technique employs a character normalization procedure and an improved stroke segmentation procedure that removes a number of problematic artifacts that can confound the dynamic programming procedure.

The technique further employs a new dynamic programming method in which substitution costs are more robustly assessed using tangent vectors, center relationships assessments and starting point-ending point assessments. The dynamic programming procedure further uses a radical categorization data structure that tags the starting and ending radicals for better matching. In addition, the dynamic programming procedure employs a technique whereby dynamic programming costs are normalized using the length of the reference radical and these normalized costs are then interactively adjusted to remove location dissimilarities based on a ranking of the dynamic programming costs.

The result of the improved dynamic programming procedure is an output of the best or n-best extracted radicals. The best extracted radical (or the n-best extracted radicals) may then be used to reduce the size of the lexicon for a subsequent full character match. While the improvements in dynamic programming are particularly useful in radical extraction, they may also be used in the subsequent full character extraction or matching operations.

For a more complete understanding of the invention, its objects and advantages, refer to the following specification and to the accompanying drawings.

BRIEF DESCRIPTION OF THE PREFERRED EMBODIMENTS

Figures 1, 2:
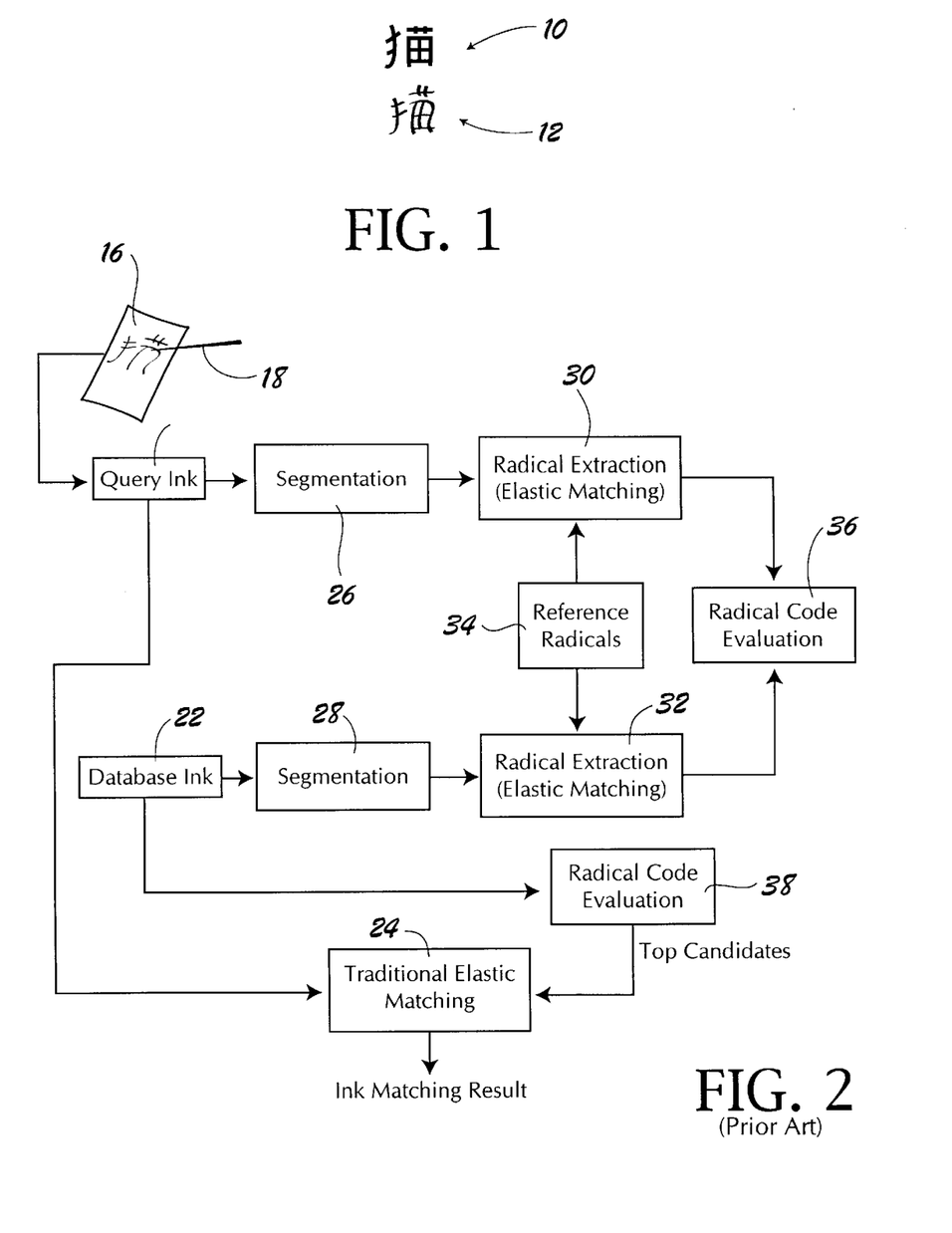
FIG. 1 is an exemplary Chinese character in both machine printed and handwritten form useful in understanding certain aspects of the radical identification process.
FIG. 2 is a block diagram providing an overview of the semantic ink matching system for Chinese handwritten annotations.

FIG. 1 illustrates an exemplary Chinese character in both machine printed or typeset form at 10 and hand drawn form at 12. The particular character means "cat" and is comprised of at least one radical, such as radical 14 (appearing on the leftmost side of the character). The radical itself has a meaning, namely, "animal". Thus, the Chinese character for "cat" includes, embedded within it, the more elemental character for "animal". This example is, of course, intended only for illustration purposes as there are at least two hundred radicals in daily use within written Chinese characters.

In general, in the Chinese language and in other languages that use the Chinese characters, radicals are small basic meaningful elements of those characters. One or more radicals can be combined to form a character. Properly written, each radical should only reside at one known sub-area within a character block. As used herein, the character block refers to the approximately rectangular area that the character occupies on the printed page. A rectangular bounding box may be drawn around the character to demark the character block. Thus, a bounding box may be thought of as a generally rectangular elastic shape that has been stretched or shrunk to fit closely around the character, touching the character only at its extremities. Radicals are placed within predefined locations within the character block.

For example, in the exemplary character illustrated in FIG. 1, the radical 14 is properly drawn to occupy the leftmost region of the character block, extending essentially the entire height of the character. In other Chinese characters, the component radicals may occupy other locations. Sometimes these locations span a sub-area that extends the full height (or full width) of the character block. Other radicals span areas less than the full height or width of the character block.

Overview of the Character Matching Process

The basic Chinese character matching process may be illustrated with reference to FIG. 2. The system illustrated in FIG. 2 shows an exemplary embodiment of a system in which the methods and apparatus of the invention may be deployed. Other systems are possible. The character matching process is preferably performed upon dynamically recorded data called "ink" data that records both temporal and spatial information. A stroke drawn on digitizing tablet 16 by stylus 18 is recorded as a sequence of points (e.g., points in the tablet's x-y coordinate space) together with certain timestamp indicia from which the direction of the stroke may be inferred. The stroke is represented in a data structure that can be used to express stroke direction and to distinguish between the starting point and the ending point of the stroke. The ink data type used by the presently preferred embodiment retains temporal (time) information as well as position (x,y point) information.

A basic objective of any hand drawn Chinese character processing system is to match the hand drawn character (supplied by the user) with previously stored information obtained through system training. The user enters a hand drawn character such as character 12 in FIG. 1 and the system matches that character with previously stored data. In this way, a handwritten annotation, written previously, may be retrieved directly. If a look up table which corresponds stored data with typeset characters is available, the user's hand drawn input can be converted into a typeset character for further processing or display.

With continued reference to FIG. 2, the user's hand drawn input is stored as query ink in the query ink data structure. Previously obtained data is stored as database ink in data store 22. Data store 22 may be populated, for example, by having the user train the system upon other examples of his or her handwriting. Training involves having the user enter examples of Chinese characters whose identities are known in advance. Thus, the user's training input may be used to construct labeled data for each character in the lexicon. A process known as elastic matching may then be used to compare the query ink in data structure 20 with the database ink in database structure 22, to select which character in the database ink data store most closely matches the character in the query ink data store.

Performing elastic matching is a time consuming process, particularly if the database ink data store contains a large lexicon, which it typically does. Recall that the Chinese language encompasses three thousand to five thousand characters in daily use.

To speed up the traditional elastic matching procedure, the radical extraction technique of FIG. 2 has been used. In FIG. 2, the traditional elastic matching operation is performed at block 24. However, before this operation is performed, the matching operation or search is considerably narrowed through a radical extraction procedure.

The radical extraction procedure involves first segmenting the query ink and also the database ink to break down each character into its component parts. Segmentation blocks 30 and 32 are provided for this purpose. In the exemplary character illustrated in FIG. 1, radical 14 may be segmented or separated from the remainder of the character identifying the white space between the components or by connected component analysis. However, as will be more fully explored in the description of the preferred embodiment to follow, hand drawn characters are rarely so neatly drawn. Quite frequently, a radical will touch or overlap other portions of the character; or the user will hurriedly draw connecting strokes between components, making radical segmentation and extraction far more difficult. The invention provides several techniques that address these issues by improving the radical segmentation and extraction processes, as will be discussed more fully below.

The segmented characters from processes 26 and 28 are each tested in the respective elastic matching blocks 30 and 32 to determine whether any of the segments represent known radicals. To accomplish this, a database of reference radicals is provided at 34. In an exemplary embodiment, there may be on the order of two hundred reference radicals. These are selected from the set of most commonly occurring radicals in the lexicon of characters. The reference radicals may be obtained through training, for example, by having the user either draw the radicals as separate components which are then labeled; or by manually extracting good examples of the radicals from the full character training data. Either way, the reference radicals provide good clean examples of ink data for the radicals against which the user's query ink and the database ink may be compared.

The extracted radicals from modules 30 and 32 are then compared in the radical code evaluation block 36. Block 36 returns only the top candidates based on matching of the radical codes. The top matching radical codes are then supplied to the further radical code evaluation block 38, which selects from the database ink data store 22 those top character candidates that have the top radical candidates. The selected characters are then fed to the elastic matching block 24 for comparison with the query ink from data store 20.

In this way, the user's input query (stored in query ink data store 20) is elastically matched with only selected characters from the database ink data store 22. By first performing elastic matching on the radicals (blocks 30 and 32), the overall matching process can be performed far more quickly. By returning the top thirty (out of two hundred) character candidates, an 85% computation reduction time is achieved.

With the semantic (radical extraction) model in mind, the radical extraction and improved dynamic programming techniques of the preferred embodiment will now be described. These techniques may be employed in performing the radical extraction in blocks 30 and 32 and the improved dynamic programming techniques can be used where elastic matching is performed (such as in blocks 30, 32 and 24 of FIG. 2). While the radical extraction framework exemplified by FIG. 2 is presently preferred, it will be appreciated that the techniques of the invention can be exploited in other applications as well.

Improved Radical Extraction

Figure 3:
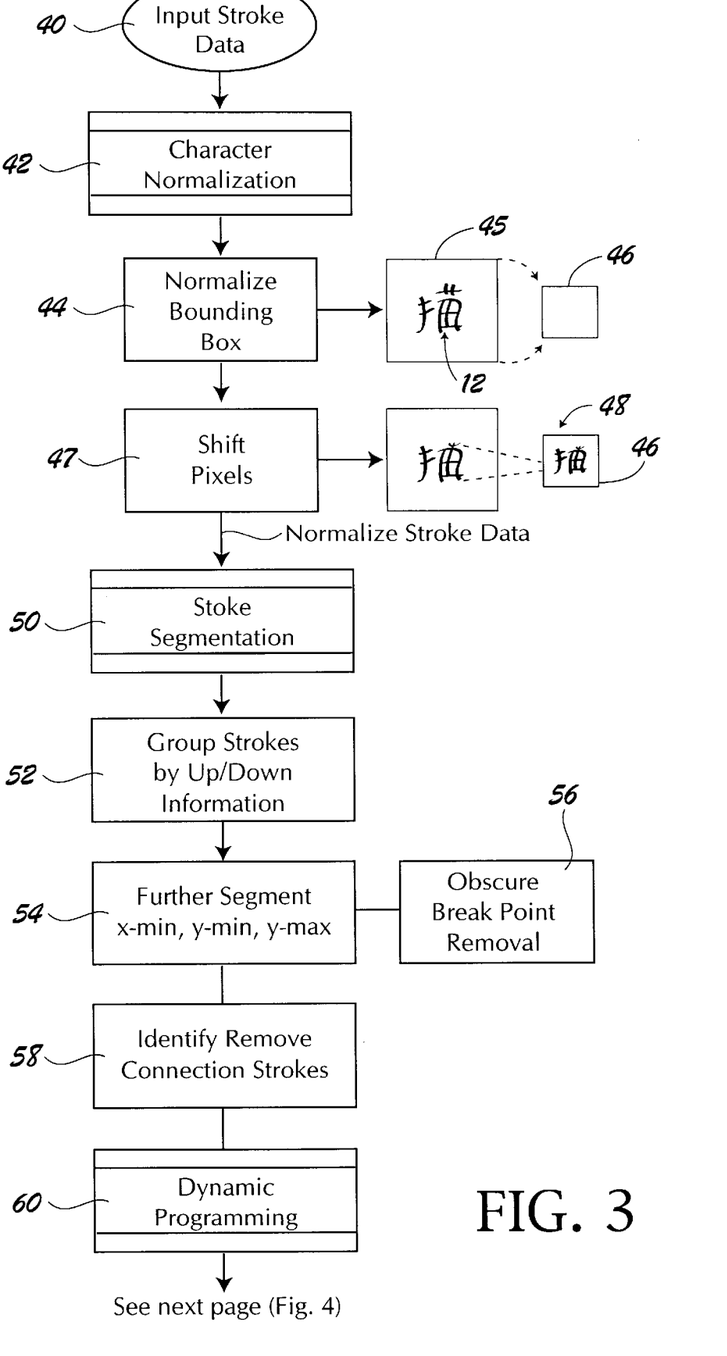
FIGS. 3 and 4 comprise a flow chart diagram illustrating the radical extraction process of the preferred embodiment.
Figure 4:
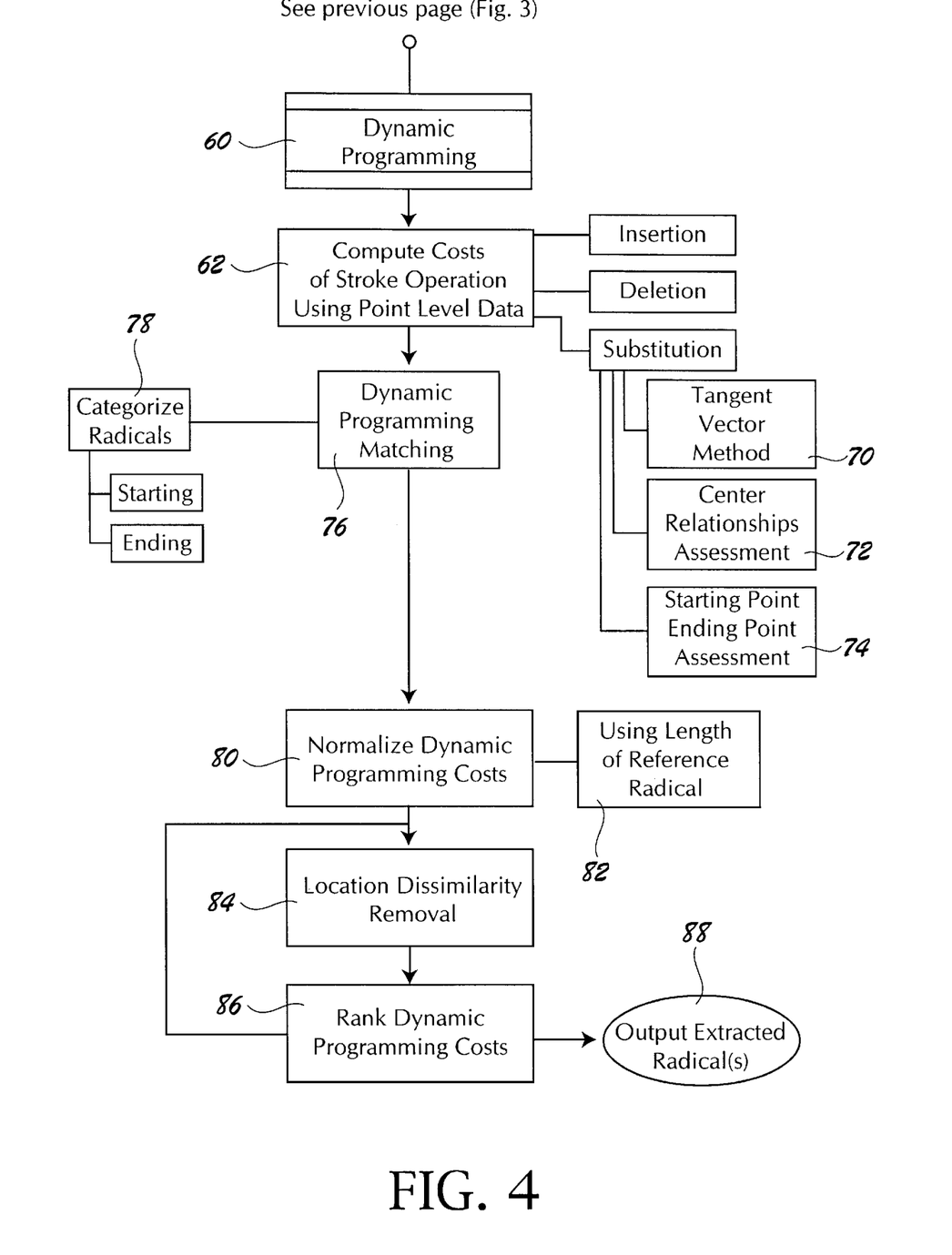

Referring to FIGS. 3 and 4, the presently preferred radical extraction techniques will now be described. The input stroke data 40 is supplied by the user as query ink, or from a database. Character normalization and stroke segmentation processes are performed on the input data prior to the dynamic programming matching operation. In FIG. 3, character normalization begins at step 42; stroke segmentation begins at step 50 and dynamic programming begins at step 60. The details of the dynamic programming steps are shown in FIG. 4.

Character Normalization

When a person writes on a non-ruled paper, his or her handwriting can differ in size from one time to the next. Thus, when a character is compared with a previously stored character, or a radical compared with a previously stored radical, the respective stroke lengths can differ.

To address this, the preferred embodiment performs character normalization by first defining a bounding box around the character and then adjusting the size of the bounding box to a normalized or standard size. In FIG. 3, bounding box 45 is drawn around character 12 and is then scaled to the standard sized bounding box 46. In the illustrated example, the originally drawn character was larger than the standardized character. Of course, in some instances the originally drawn character will be smaller than the standard character, in which case the size of the bounding box will be scaled up.

As indicated at step 47, the pixels or points which make up the character are then shifted as illustrated at 48 so that the originally drawn character is contracted or expanded in size to fill the normalized bounding box 46.

In the presently preferred embodiment, linear normalization is used. The bounding box of each character is normalized to a standard character size and pixels within the characters are shifted accordingly. Suppose $(x_1, y_1)$, $(x_2, y_2)$ are the top-left and bottom-right corners of the bounding box of a character, respectively. For a point $(x, y)$ within the character, the new coordinate after normalization will be:

$$x'=0+(x-x_1)f_x$$
$$y'=0+(y-y_1)f_y$$

where $f_x$ and $f_y$ are the scaling factor in x and y direction, respectively. $f_x$ and $f_y$ are defined as:

$$f_x=S_x/(x_2-x_1)$$
$$f_y=S_y/(y_2-y_1)$$

where $S_x$ is the standard character size we choose for width, and $S_y$ is for height. Currently, $S_x$ and $S_y$ are chosen as 40 and 50, respectively. After normalization, the top-left corner of the bounding box of each character is shifted to the origin (0,0).

In the preferred embodiment, a similar normalizing operation is performed on the reference radicals 34 (FIG. 2). When normalizing a reference radical, we normalize the entire character that contains the radical. In the training process, reference radicals are not trained directly. In order to maintain the radical location information for each reference radical, we select a character that contains this radical and ask the user to write that character. Later, the reference radical may be extracted from its corresponding character interactively. We normalize the size of the reference (training) character before dynamic programming is utilizing.

Stroke Segmentation

After the stroke data is normalized through character normalization, stroke segmentation proceeds by first grouping strokes according to pen down and pen up information as indicated at step 52. Pen down and pen up information, and the temporal order of the incoming points are acquired when the input stoke data 40 is captured. The incoming points are grouped into initial strokes, beginning with a pen down point and ending with a pen up point. The system then breaks these initial strokes further into smaller strokes as indicated at step 54. This further segmentation is performed by breaking the initial strokes at local minima and maxima of the y values and local minima of the x values. We call these break points "internal breaking points" to distinguish them from pen down and pen up breaking points of the initial strokes.

Sometimes the mathematical minima or maxima points are not immediately apparent to the human eye. They are nevertheless there in the data. We call these points "obscure" break points. The presently preferred embodiment removes obscure break points at step 56. The obscure break point removal process defines obscure break points according to the following: Suppose $P_{n-i}, \ldots, P_{n-1}, P_n, P_{n+1}, \ldots P_{n+j}$ are consecutive incoming points, in their temporal order. Let $P_{n-i}$, $P_n$ and $P_{n+j}$ be breaking points, and $P_n$ be an internal breaking point because of its local minima of y value. To check if $P_n$ is "obscure", we define $dy_1$ as the average difference in y values of two consecutive points for the "tentative stroke" $P_{n-j}, \ldots P_n$, and $dy_2$ the average difference for the tentative stroke $P_n, \ldots P_{n+j}$ as follows:

$$dy_1 = \frac{1}{i} \sum_{k=n-i}^{n-1} ((p_k)_y - (p_{k+1})_y) = [(p_{n-i})_y - (p_n)_y]/i$$

$$dy_2 = \frac{1}{j} \sum_{k=n+1}^{n+j} ((p_{k-1})_y - (p_k)_y) = [(p_n)_y - (p_{n+j})_y]/j$$

For an internal breaking point to be obvious, we prefer relatively larger absolute values of $dy_1$ and $dy_2$. Since $dy_1$ and $dy_2$ are usually at opposite directions, the following rule is adopted:

If $|dy_1 - dy_2| \leq T$, $P_n$ is an obscure internal breaking point, hence it should be removed.

T is a threshold, which is currently set to 0.5. The procedures for removing obscure x-min and y-max breaking points are similar.

After removing obscure break points, any connection strokes are identified and removed at step 58. Connection strokes are quite common in handwritten Chinese characters. Connection strokes are those strokes that are not part of the standard characters for printed handwritten characters. In cursive handwriting, sometimes two separate strokes are connected by an extra stroke, i.e., a connection stroke.

Connection strokes are detected by examining the stroke data to asses the direction of the stroke. If the stroke goes from bottom-right to upper-left it is highly likely that this is a connection stroke.

In reality, the connection stroke may not appear in a handwritten character consistently. The extra connection stroke is more likely to be affected by the speed and direction of the stylus when the character was formed. For example, one user may normally write in a neat, printed form with no connection strokes. However, at times when the user is in a hurry, connection strokes may appear.

The presently preferred stroke removal technique uses the following rule to detect and remove connection strokes:

If $e_y - s_y \leq 1$ and $e_x - s_x \leq 1$, then this is a connection stroke.

In the above equation $(s_x, s_y)$ and $(e_x, e_y)$ are starting and ending points of a segmented stroke, respectively and the origin (0,0) is located at the top left corner of the digitizing tablet or capturing device.

Once the above-described stroke segmentation processes are completed, dynamic programming may now be performed as symbolized at step 60. The dynamic programming procedure of the preferred embodiment is shown in greater detail in FIG. 4.

Dynamic Programming

The purpose of dynamic programming is to match two pieces, such as the reference radical and the questioned character. The matching process is performed at the stroke level; therefore, the result is the best stroke relationship or match between two handwritings. The cost associated with this match is calculated. Because dynamic programming is performed at the stroke level, stroke operations (insert a stroke, delete a stroke or substitute a stroke) are calculated first in the preferred embodiment.

The preferred embodiment calculates costs of stroke operations using point level data as indicated at 62. This differs from the conventional approach in which stroke insertion cost and deletion cost are computed in the direction proportion to the length of the strokes and substitution cost is computed based on shape similarity. In contrast, the preferred embodiment treats each stroke as a consecutive point sequence in which dynamic programming is performed at the point level to entirely match two point sequences. The point level computation involves the basic operations: insertion 64, deletion 66 and substitution 68. Substitution cost assessment in the preferred embodiment uses a number of improved techniques, including a tangent vector methodology 70, a center relationships assessment 72, and starting point-ending point assessment 74. These will be discussed below. However, before proceeding with a discussion of these improved techniques, refer to FIG. 5 which illustrates one of the shortcomings of conventional substitution cost measurement.

Figure 5:
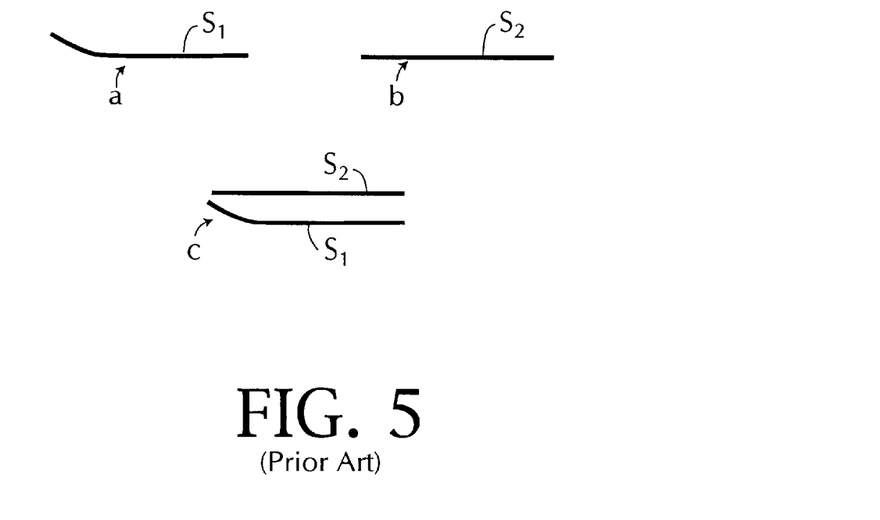
FIG. 5 is a radical matching diagram, illustrating one of the shortcomings of conventional shape similarity assessment.

In conventional substitution cost measurement, shape similarity between two strokes, such as stroke $s_1$ at a and $s_2$ at b. The assessment is performed by first temporarily aligning the two strokes as at c so that their upper-left corners (or the upper-left corners of their respective bounding boxes) overlap. As illustrated at c, by aligning the strokes at their upper-left most corners, the remainders of the strokes lie apart a comparatively large Euclidean distance, notwithstanding the fact that the strokes are basically similar except for the upper-left most portions. This leads to an accumulated error, such that substitution cost is asses at a higher value than the overall shapes would otherwise dictate.

Figure 6:
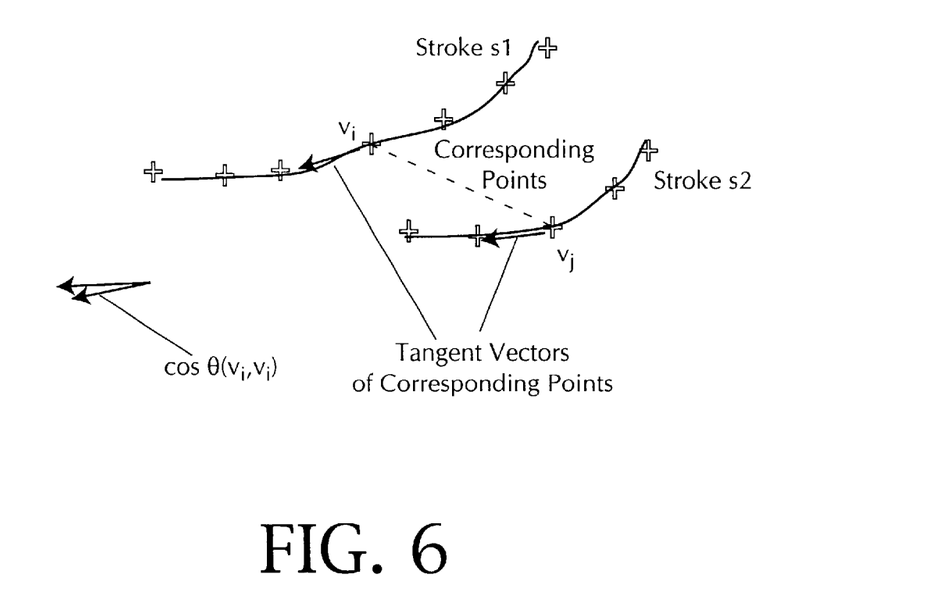
FIG. 6 is a radical matching diagram, illustrating the tangent vector technique of the preferred embodiment.

FIG. 6 illustrates how substitution cost is assessed according to the preferred embodiment of the invention. Referring to FIG. 6, we define the corresponding points of two strokes as follows:

Let $s_1$ be a stroke with $l_1$ points, and $s_2$ be a stroke with $l_2$ points. $P_i$ is the ith point within on $s_1$, the corresponding point of $P_i$ on stroke $s_2$ is $P_j$, where $$j = \frac{i}{l_1} l_2$$

Next, we calculate the substitution of two corresponding points $P_i$ and $P_j$ as follows:

POINT_SUB_COST($P_i|s_1,s_2$)=1−cos$\theta(v_1,v_j)$ where $v_i$ is the tangent vector at point $P_i$ and $v_j$ is the tangent vector at $P_j$; $\theta(v_i, v_j)$ is the angle between the two vectors, and $\theta \in [0,\pi]$.

The cos$\theta(v_i, v_j)$ can be calculated as:

$$\cos\theta(v_i, v_j) = \frac{(x_2 - x_1) \times (x_4 - x_3) + (y_2 - y_1) \times (y_4 - y_3)}{\sqrt{(x_1 - x_2)^2 + (y_1 - y_2)^2} \times \sqrt{(x_3 - x_4)^2 + (y_3 - y_4)^2}}$$

where $(x_1, y_1)$ and $(x_2, y_2)$ are the starting and ending point of v; respectively; $(x_3, y_3)$ and $(x_4, y_4)$ are the starting and ending point of $v_j$, respectively.

As can be seen, the larger $\theta(v_i, v_j)$ is, the larger the value of POINT_SUB_COST $(v_1, v_j)$ is. The substitution of two corresponding points does not reflect their Euclidean distance, but rather the difference of "instantaneous" shape between two strokes at these corresponding points. By summing up the point substitution costs for all the points along the stroke $s_1$, we can obtain the substitution cost between stroke $s_1$ and $s_2$:

$$\text{STROKE\_SUB\_COST}(s_1, s_2) = \sum_{i=1}^{l_1} \text{POINT\_SUB\_COST}(p_i \mid s_1, s_2)$$

where $l_1$ is the length of stroke $s_1$. Let us modify this stroke substitution cost by further normalizing as follows:

$$\text{STROKE\_SUB\_COST}(s_1, s_2) =$$
$$\max\left(\frac{l_2}{l_1}, \frac{l_1}{l_2}\right) \times \frac{(l_2 + l_1)/2}{l_1} \sum_{i=1}^{l_1} \text{POINT\_SUB\_COST}(p_i \mid s_1, s_2)$$

where the term $$\frac{(l_2 + l_1)/2}{l_1}$$

reflects the average length between the two strokes, and $$\max\left(\frac{l_2}{l_1}, \frac{l_1}{l_2}\right)$$

reflects the difference in stroke size, so that the larger the difference in stroke size, the larger the substitution cost is.

After normalization, we should approximately have

STROKE_SUB_COST($s_1,s_2$)≈STROKE_SUB_COST($s_2,s_1$)

The new stroke substitution cost can overcome several disadvantages. First, by finding the corresponding points, we can eliminate the dynamic programming procedure in calculating the point substitution cost. Secondly, as illustrated in FIG. 6, the calculation of substitution cost using tangent vectors does not have cumulative effects.

The tangent vector method of assessing substitution costs, outlined above, allows strokes to be matched without considering the structure information of the strokes. To further improve performance, the structural relationships of strokes may be assessed through an assessment of the center relationships of the strokes and their starting point and ending points.

Figure 7:
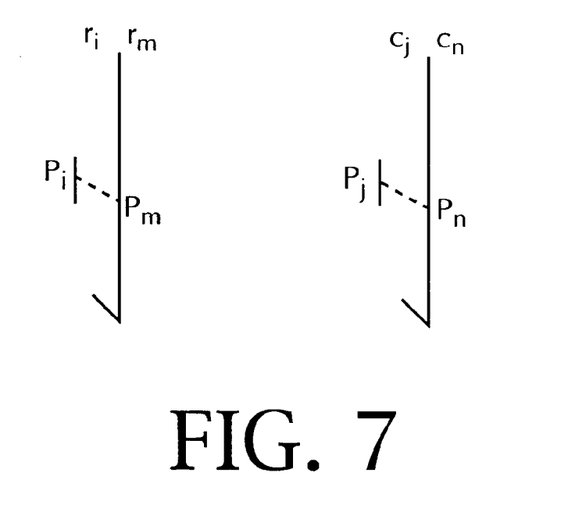
FIG. 7 is a radical matching diagram, illustrating the center relationship technique.

When a user forms a Chinese character, strokes within the character are arranged in a structural relationship (i.e., a spatial relationship among the strokes). To asses the structural relationships, the weighted center of a stroke is calculated and used to indicate the position of the stroke. Structural information can be reflected by the spatial relationship between the two stroke centers as illustrated in FIG. 7. Before two strokes are matched and their substitution costs calculated, the system first looks up the last two strokes that have been matched or substituted. Referring to FIG. 7, the last two matched strokes $r_i$ (the ith stroke of the reference radical) and $c_j$ (the jth stroke of the character). The system will then match $r_m$ and $c_n$.

Let $p_i$, $p_j$, $p_m$, $p_n$ be the weighted centers for $r_i$, $c_j$, $r_m$ and $c_n$, respectively. The vector $\overrightarrow{p_i p_m}$ can reflect the spatial relationship between the two strokes $r_i$ and $r_m$. Similarly, the vector $\overrightarrow{p_j p_n}$ can reflect the spatial relationship between $c_j$ and $c_n$. When we try to match $r_m$ to $c_n$, not only should $r_m$ and $c_n$ be similar in shape, but also their spatial relationship to the previously matched strokes (i.e., $r_i$ and $c_j$, respectively) should be similar. In other words, the angle between the vectors $\overrightarrow{p_i p_m}$ and $\overrightarrow{p_j p_n}$ should be small.

Our criteria is:

If $$\theta(\overrightarrow{p_i p_m}, \overrightarrow{p_j p_n}) \geq \theta_T,$$

then $r_m$ and $c_n$ should not be matched. $\theta_T$ is a threshold, currently set to $\pi/2$. In dynamic programming, if the two strokes being examined are determined not to match, we set the substitution cost to a very high number thus substitution will not happen. Otherwise, we proceed calculating the stroke substitution cost using the method described above.

An exception is that the direction of the resulting zero length vector has no meaning if $p_i=p_m$ or $p_i=p_n$. Therefore, in this case, the above criteria will be ignored, and substitution cost will be calculated.

The preferred embodiment also assesses the starting point and ending point in computing substitution costs. The system examines two strokes for possible matching, by first looking at the last two strokes that were matched or substituted. The starting point of one stroke and the ending point of the next stroke are used to define a vector that establishes an angle against which the strokes to be matched are compared. The procedure may be understood with reference to FIG. 8.

Figure 8:
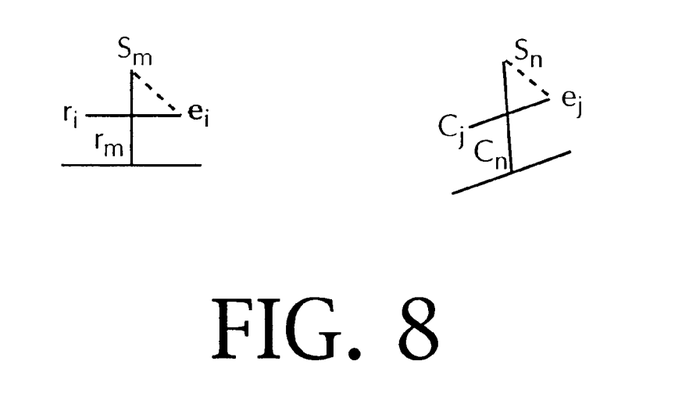
FIG. 8 is a radical matching diagram, illustrating the starting point, ending point assessment.

As shown in FIG. 8, let the last two matched strokes be $r_i$ (the ith stroke of the radical) and $c_j$ (the jth stroke of the character). The two strokes under examination are $r_m$ and $c_n$. Let $e_i$ and $e_j$ be the ending points of the stroke $r_i$ and $c_j$, respectively. Let $s_m$ and $s_n$ be the starting points of the stroke $r_m$ and $c_n$ respectively. The vector $\overrightarrow{e_i s_m}$ reflects the spatial relationship between the two strokes $r_i$ and $r_m$. Similarly, the vector $\overrightarrow{e_i s_n}$ reflects the spatial relationship between the strokes $c_j$ and $c_n$. When we try to match stroke $r_m$ to stroke $c_n$, not only should $r_m$ and $c_n$ be similar in shape, but also their spatial relationship to previously matched strokes (i.e., $r_i$ and $c_j$, respectively) should be similar. In other words, the angle between the vectors $\overrightarrow{e_i s_m}$ and $\overrightarrow{e_j s_n}$ should be small.

Our criteria is:
If $$\theta(\overrightarrow{e_i s_m}, \overrightarrow{e_j s_n}) \geq \theta_T,$$

then $r_m$ and $c_n$ should not be matched. $\theta_T$ is a threshold, currently set to $\pi/2$. Similar to center point vector, in dynamic programming, if the two strokes being examined are determined not to match, we set the substitution cost to a very high number thus substitution will not happen. Otherwise, we proceed calculating the stroke substitution cost using the method described above.

Again, sometimes when two consecutive strokes are connected, the ending point of the first stroke happens to be the starting point of the second stroke, i.d., $e_i = s_m$ or $e_j = s_n$. In this case, the above criteria will be ignored and substitution cost shall be calculated.

After the insertion costs, deletion costs and substitution costs have been calculated as set forth above, dynamic programming matching is performed at 76. Dynamic programming matching is improved in the presently preferred embodiment through a categorization of radicals procedure 78 that categorizes radicals into two main categories. In the first category, radicals start the first several strokes of a character. In the second category, radicals end the last several strokes of the character.

The category that a radical belongs to is usually known in advance. This category information is reinforced in the presently preferred dynamic programming matching process. When a reference radical is matched to a character, more cost is added if the matched strokes within the character do not fall within the category expected for that radical. The presently preferred implementation can be explained via the following dynamic programming procedure.

Previously, dynamic programming is used to match a reference radical $R = r_1 r_2 \ldots r_m$ to a subsequence of a character $C = c_1 c_2 \ldots c_m$. In this process, three operations: insertion, deletion or substitution may occur depending on each operational cost. The final goal is to find an optimal sequence of operations with minimum total cost. For example, as an example, let $r = r_1 r_2 r_3 r_4$ be the reference radical consisting of four strokes and $C = c_1 c_2 c_3 \ldots c_8$ be the matching character consisting of eight strokes. To transform R to a subsequence of C, i.e., $c' = c = c_3 c_4 c_5 c_6$, one possible operation sequence might be: insert $c_1$, insert $c_2$, substitute $r_1$ with $c_3$, substitute $r_2$ with $c_4$, insert $c_5$, substitute $r_3$ with $c_6$ and delete $r_4$, as illustrated in Table 1.

TABLE 1

Dynamic programming procedures for matching a first category radically partially to a subsequence of a character.
I: insert; S: substitute; D: delete

|       | $C_1$ | $C_2$ | $C_3$ | $C_4$ | $C_5$ | $C_6$ | $C_7$ | $C_8$ |
|-------|-------|-------|-------|-------|-------|-------|-------|-------|
| $R_1$ | I     | I     | S     |       |       |       |       |       |
| $R_2$ |       |       |       | S     | I     |       |       |       |
| $R_3$ |       |       |       |       |       | S     |       |       |
| $R_4$ |       |       |       |       |       | D     |       |       |

In original dynamic programming procedure, we allow a matching to start anywhere within stroke sequence C and end anywhere. In the above example, the actual matching starts from substituting $r_1$ with $c_3$ and ends with deleting $r_4$. Therefore, the total cost is the sum of substituting $r_1$ with $c_3$, substitute $r_2$ with $r_4$, inserting $c_5$, substituting $r_3$ with $c_6$ and deleting $r_4$, and the cost of inserting $c_1$ and inserting $c_2$ are not considered.

When taking radical category into account, we attempt to add penalty to the radicals in the first category that are not matched to the first several strokes of characters or the radicals in the second category that are not matched to the last several strokes of characters. In order to do this, we modify the dynamic programming procedure to allow a matching to start from the first stroke of the matching character and ends anywhere for first category radicals; and allow a matching to start anywhere within a character and ends at the last stroke for second category radicals. In case of Table 1, the total cost would be the sum of inserting $c_1$, inserting $c_2$, substituting $r_1$ with $c_3$, substitute $r_2$ with $r_4$, inserting $c_5$, substituting $r_3$ with $c_6$ and deleting $r_4$. As can be seen, the matching was penalized by the costs of inserting $c_1$ and inserting $c_2$ because the substitution does not start with the first stroke of C. As before, for first category radicals, the dynamic programming can end anywhere within a character.

Similarly, for a radical R that belongs to the second category, it is expected to match a subsequence of C that ends at $c_m$, the last stroke of C. A possible operation sequence, for example, can be: insert $c_1$, insert $c_2$, substitute $r_1$ with $c_3$, substitute $r_2$ with $r_4$, insert $c_5$, substitute $r_3$ with $c_6$, delete $r_4$, insert $c_7$ and insert $c_8$, as illustrated in Table 2.

TABLE 2

Illustration of dynamic programming procedure for matching second category radical to a character.

|       | $C_1$ | $C_2$ | $C_3$ | $C_4$ | $C_5$ | $C_6$ | $C_7$ | $C_8$ |
|-------|-------|-------|-------|-------|-------|-------|-------|-------|
| $R_1$ | (I)   | (I)   | S     |       |       |       |       |       |
| $R_2$ |       |       |       | S     | I     |       |       |       |
| $R_3$ |       |       |       |       |       | S     |       |       |
| $R_4$ |       |       |       |       |       | D     | I     | I     |

In this case, the first two insertion operations (inserting $c_1$ and inserting $c_2$) should be executed with zero costs because a matching can start from anywhere in the character. However, the costs for the last two insertion operations (inserting $c_7$ and inserting $c_8$) should not be ignored.

Dynamic programming matching step 76 produces a total dynamic programming cost for matching a reference radical to a part of a character. The total is the sum of all operational costs (insertion, deletion and substitution). Therefore, for each character, when all reference radicals are attempted to match it, the radicals with fewer strokes tend to yield smaller dynamic programming costs. This can lead to aberrant results. To solve this, the presently preferred embodiment normalizes dynamic programming costs as indicated at step 80, using the length of a reference radical 82. Normalizing the dynamic programming costs, removes the inherent benefit that radicals with fewer strokes tend to have, resulting in a more robust radical extraction procedure.

Location similarity between two radicals (e.g., reference radical and the testing radical) is some course information that can be exploited in the radical extraction scheme. As illustrated at step 84, the preferred embodiment uses location similarity as basis to sift out radicals, removing those where the location are dissimilar. For each character the removal process involves applying elastic matching based on dynamic programming to all reference radicals. The procedure then calculates the location similarity of matched strokes between reference radicals and the character. After the radicals with negative location similarity are removed, dynamic programming costs for the remaining radicals are ranked and the top two radicals with the least costs are chosen as the extracted radicals for the character. As illustrated, the ranking step 86 and dissimilarity removal step 84 are iterated through all reference radicals. The end product of this procedure thus represents the extracted radical or radicals, illustrated at 88.

Radical Code Evaluation

After radicals are extracted for each character, a character string becomes a sequence of radical codes, i.e., radical IDs. When two character strings are compared, the matching is done via dynamic programming on radical code level. This applies to both handwriting being matched to handwriting (i.e., handwritten database and handwritten query) and handwriting being matched to typed text (i.e., handwritten database and typed text query). For typed queries, these can be converted to radical codes immediately and compared with the radical codes of database strings.

In dynamic programming for matching two character strings, three basic operations are defined: character insertion, character deletion and character substitution, each associated with an operation cost. The objective is to transform radical codes of the query string into that of the data string. With dynamic programming, the system obtains an optimal matching sequence that achieves the least edit distance (minimum total operation costs).

The character insertion and deletion costs are assigned as constants. The character substitution costs reflects the difference between two characters (i.e., four radical codes, two for each character). Character substitution is defined as the number of occurrences where a radical code in one character is not found in the other. If a character has no radical codes extracted, it is represented by two null radical codes (codes with ID zero) and the substitution cost is calculated the same way.

If desired, the null radical code can be modified as follows. Each character has two extracted radicals and therefore each character may be represented by two numbers corresponding to the radical IDs. If no radical is extracted, the radical code is null and the radical ID is zero. In one embodiment, the character substitution is calculated the same way for mismatched radical codes or non-extracted radical codes. However, if desired, a more severe penalty may be applied to non-extracted radical codes as compared with mismatched radical codes.

Furthermore, as can be seen from the previous algorithm, each extracted radical is treated equally. Particularly, when two radical codes are the same, they contribute nothing to the substitution costs. Although this method encourages match in radical codes, it does not benefit match in radical codes with less radical extraction cost, i.e., with more reliable extracted radicals. When each radical code is obtained in the radical extraction process, a dynamic programming cost is associated with it. The new method proposes to associate this dynamic programming cost from previous radical extra into the substitution cost calculation. If two radical codes match, both with high confidence (low cost from radical extraction), their substitution cost should be less than that of two radical codes with low confidence. By combining methods, we describe our new character substitution cost as follows.

Let us compare two characters $C_1 = a_1, a_2$ and $C_2 = b_1, b_2$, where $a_1 a_2$ are extracted radicals from $C_1$, and $b_1 b_2$ are extracted radicals from $C_2$. Also, dpCOST_b1, dpCOST_b2, dpCOST_a1, dpCOST_a2 are the dynamic programming costs on stroke level, i.e., radical extraction costs, for $b_1, b_2, a_1$, and $a_2$, respectively. The substitution cost for these two characters will be $$\text{SUB\_COST}(b_1, b_2; a_1 a_2) = \text{COST}(b_1; a_1, a_2) + \text{COST}(b_2; a_1, a_2)$$

where $\text{COST}(b_1; a_1, a_2)$ is the substitution cost for $b_1$, it is:

$$COST(b_1; a_1, a_2) = \begin{cases} c_{\text{sub\_max}}/2 & b_1 = 0 \\ (\text{dpCOST\_b1} + \text{dpCOST\_a1})/2 & b_1 = a_1 \\ & \text{if} \\ (\text{dpCOST\_b1} + \text{dpCOST\_a2})/2 & b_1 = a_2 \\ c_{\text{sub\_max}}/2 & o.w \end{cases}$$

and $\text{COST}(b_2; a_1, a_2)$ is the substitution cost for $b_2$:

$$COST(b_1; a_1, a_2) = \begin{cases} c_{\text{sub\_max}}/2 & b_2 = 0 \\ (\text{dpCOST\_b2} + \text{dpCOST\_a1})/2 & b_2 = a_1 \\ & \text{if} \\ (\text{dpCOST\_b2} + \text{dpCOST\_a2})/2 & b_2 = a_2 \\ c_{\text{sub\_max}}/2 & o.w \end{cases}$$

where $C_{sub\_max}$ is an assigned constant that represents the worst case substitution cost when $(a_1\ a_2)$ and $(b_1 b_2)$ are completely different. From experiments, dpCOST_x is always less than $C_{sub\_max}$ for any stroke x.

Whenever there is a match in radical codes (e.g., $b_1 = a_2$), $\text{COST}(b_1; a_1, a_2)$ and $\text{COST}(b_1; a_1, a_2)$ will be less than $C_{sub\_max}/2$ and the final substitution cost will be less than $C_{sub\_max}$.

Reference Radicals

In constructing a working embodiment, reference radicals should be selected with a view towards improving the overall semantic matching process. The selection of reference radicals directly affects the radical extraction process. Usually, the more radicals that are correctly extracted, the higher the final matching rate. One way to increase the number of correctly extracted radicals is to increase the number of reference radicals. Consequently, more radicals are extracted. However, it takes more time to train reference radicals and more time to extract reference radicals when the reference radical database is increased. Therefore, selecting the correct number of radicals becomes a trade-off between processing time and matching rate.

Figure 9:
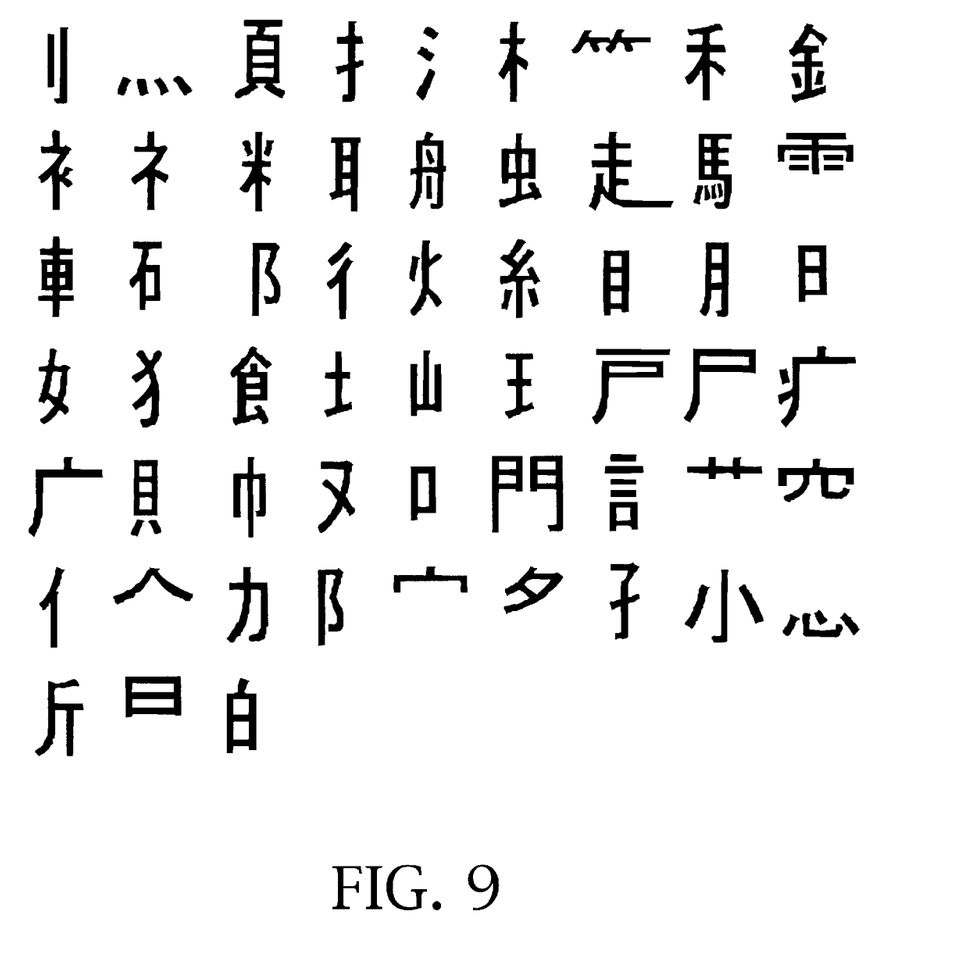
FIG. 9 is an illustration of the presently preferred set of radicals.

Another consideration in radical selection involves similarity among radicals. Putting similar radicals together in a training set may cause confusion. Also, some radicals are more difficult to extract because there are simply too many different ways to write them. Radicals that are likely to cause confusion and those that can be written in numerous different ways are best eliminated from the reference radical set used for radical extraction. FIG. 9 depicts the presently preferred radicals for use in implementing a Chinese character recognition system. The first 45 reference radicals illustrated comprise those that occur most frequently in the two thousand or so commonly used Chinese characters. Because these characters do not necessarily appear in Chinese handwriting with the same frequency, we supplement this set with an additional twelve radicals that are chosen from the most frequently used radicals in the database strings. In designing a working embodiment, these reference radicals can be used to build the initial embodiment. Thereafter, as the system is used, some additional radicals may be identified and added to the reference radical data set based on frequency of use statistics.

In view of the foregoing, It will be appreciated that the radical extraction techniques described herein can be used either singly or in combination with one another to improve the overall semantic matching process. While the invention has been described in its presently preferred form, it will be understood that certain modifications can be made without departing from the spirit of the invention as set forth in the appended claims.

What is claimed is:

1. A method for retrieving cursive handwritten annotations, comprising:

storing a lexicon of annotations made up of point level data;

storing a plurality of radicals that correspond to semantically meaningful portions of said annotations;

inputting a handwritten annotation to be retrieved, said handwritten annotation made up of point level data;

extracting at least one radical from said input handwritten annotation by first normalizing said input handwritten annotation and then identifying a portion of said handwritten annotation to represent the extracted radical;

performing an evaluation operation between said extracted radical and said stored plurality of radicals to identify at least one candidate radical;

using said candidate radical to select a subset of said lexicon;

performing a dynamic programming matching operation between said input handwritten annotation and said subset by computing substitution costs between point level data of said normalized input handwriting annotation and point level data of said subset to retrieve an annotation from said lexicon.

2. The method of claim 1 wherein said normalizing step is performed by representing said handwritten annotation as a plurality of points and scaling the spacing between said points such that the input handwritten annotation is scaled to a predetermined size.

3. The method of claim 1 wherein said extracting step is performed by identifying strokes within said input handwritten annotation and then organizing said strokes based on up/down information associated with said strokes.

4. The method of claim 1 wherein said extracting step is performed by identifying strokes within said input handwritten annotation and then organizing said strokes based on local maxima and minima points within said strokes.

5. The method of claim 4 further comprising selectively removing selected local maxima and minima points.

6. The method of claim 1 wherein said extracting step is performed by identifying connecting strokes within said input handwritten annotation and removing said connecting strokes.

7. The method of claim 1 wherein said evaluation operation is performed by representing both said extracted radical and said stored plurality of radicals as series of contiguous points and performing dynamic programming matching on said respective series of contiguous points.

8. The method of claim 1 wherein said evaluation operation includes a dynamic programming matching operation that yields at least one programming cost metric indicative of the closeness of the match.

9. The method of claim 8 further comprising determining the length of a reference radical and normalizing said programming cost metric with respect to the length of said reference radical.

10. The method of claim 1 wherein said evaluation operation includes a dynamic programming matching operation that includes the step of categorizing radicals based on starting point and ending point.

11. The method of claim 1 wherein said evaluation operation includes a dynamic programming matching operation that includes the step of calculating a substitution cost by comparing tangent vectors associated with said extracted radical and said stored plurality of radicals.

12. The method of claim 1 wherein said evaluation operation includes a dynamic programming matching operation that includes the step of assessing the relationship between the center of said extracted radical and the centers of said stored plurality of radicals.

13. The method of claim 1 wherein said evaluation operation includes a dynamic programming matching operation that includes the step of assessing the starting points and the ending points of said extracted radical and said stored plurality of radicals.

14. The method of claim 1 wherein said evaluation operation includes the steps of comparing strokes within said extracted radical with strokes within said plurality of radicals and removing said candidate radicals that have a negative location similarity.

15. The method of claim 1 wherein said evaluation operation produces a plurality of extracted radical candidates and includes the step of ranking said candidates based on dynamic programming cost.

16. A method for retrieving cursive handwritten annotations, comprising:

storing a lexicon of annotations made up of point level data;

extracting a plurality of radicals that correspond to semantically meaningful portions of said annotations;

inputting a handwritten annotation to be retrieved, said handwritten annotation made up of point level data;

extracting at least one radical from said input handwritten annotation;

performing an evaluation operation between said extracted radical and said stored plurality of radicals to identify at least one candidate radical;

using said candidate radical to select a subset of said lexicon;

performing a dynamic programming matching operation between said input handwritten annotation and said subset by computing substitution costs between point level data of said input handwritten annotation and point level data of said subset to retrieve an annotation from said lexicon.

* * * * *